(12) United States Patent
Nambiar (10) Patent No.: US 9,408,044 B2
(45) Date of Patent: Aug. 2, 2016

(54) VIDEO MULTICAST OPTIMIZATION

(75) Inventor: Brijesh Nambiar, Santa Clara, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 13/460,821

(22) Filed: Apr. 30, 2012

(65) Prior Publication Data

US 2013/0286922 A1 Oct. 31, 2013

(51) Int. Cl.
*H04W 4/06* (2009.01)

(52) U.S. Cl.
CPC . *H04W 4/06* (2013.01); *Y02B 60/50* (2013.01)

(58) Field of Classification Search
CPC ............ H04L 49/201; H04L 49/3072; H04N 21/4621
USPC .......................... 370/312, 389, 437; 348/207, 348/14.08–14.16, 14.01; 725/13, 38
See application file for complete search history.

(56) References Cited

U.S. PATENT DOCUMENTS

| | | | |
|---|---|---|---|
| 2005/0254444 A1* | 11/2005 | Meier et al. | 370/312 |
| 2006/0171407 A1* | 8/2006 | Kim et al. | 370/432 |
| 2007/0061831 A1* | 3/2007 | Savoor et al. | 725/13 |
| 2007/0160038 A1* | 7/2007 | Liu et al. | 370/389 |
| 2009/0168681 A1* | 7/2009 | Moon | 370/312 |
| 2009/0313673 A1* | 12/2009 | Grozis | 725/118 |
| 2010/0071062 A1* | 3/2010 | Choyi et al. | 726/23 |
| 2010/0260091 A1* | 10/2010 | Seok | 370/312 |
| 2011/0305170 A1* | 12/2011 | Lai et al. | 370/261 |
| 2012/0207170 A1* | 8/2012 | Patel et al. | 370/395.53 |
| 2014/0313989 A1* | 10/2014 | Doken et al. | 370/329 |

* cited by examiner

*Primary Examiner* — Andrew Chriss
*Assistant Examiner* — Romani Ohri
(74) *Attorney, Agent, or Firm* — Hewlett Packard Enterprise Patent Department (57) ABSTRACT

A network device includes a communication interface and a processor. The communication interface may receive a multicast stream that includes a frame. The processor is coupled to the communication interface and may determine whether to send the frame unicast or multicast. The communication interface transmits the frame unicast or multicast based on the determination by the processor. The determination by the processor may be based on characteristics of the frame. If the characteristics of the frame include characteristics of a key frame such as an I-frame, the processor may determine to transmit the frame unicast. The determination may also be based on a predetermined state of client devices that are to receive the frame. If a client device is in a predetermined state such as a power save state, the processor may determine to transmit the frame unicast to that client device. Other embodiments are also described.

24 Claims, 5 Drawing Sheets

VIDEO MULTICAST OPTIMIZATION

FIELD

An embodiment of the invention relate generally to wireless digital networks, and more particularly, to managing video distribution in a wireless network.

BACKGROUND

Data networks, particularly IEEE 802.11 wireless data networks, have become an expected or necessary resource in an increasing number of situations. Once present only in the workplace environment, these data networks are becoming ubiquitous. They are encountered in schools, libraries, retail environments, and other gathering locations. As the use of these networks moves from a business setting to a consumer oriented setting, the static web pages of yesterday are being overwhelmed by the mixing of media streams, particularly with the addition of video streams. While the solutions have evolved for handling video distribution, particularly using multicast, many of these solutions were developed for wired networks, and do not translate adequately to the wireless environment.

Wired (IEEE 802.3) and wireless (IEEE 802.11) networks implement two data transfer models: unicast and multicast. In the unicast model, packets are sent from a source to a particular single destination. Unicast is a one-to-one data transmission. Unicast protocols, such as those based on Transmission Control Protocol (TCP), provide for error detection and packet retransmission to recover from missing or damaged packets arriving at the destination.

In contrast, the multicast model allows for one-to-many distribution of data. Multicast uses User Datagram Protocol (UDP), which is a connectionless protocol that does not support retransmission of packets. Multicast distribution of video streams allows for a single stream including a single set of packets to be sent to a plurality of devices. For example, in a University lecture hall setting, multiple devices such as student laptops or tablets may subscribe to a single multicast video stream of the lecture. Multicast allows multiple users (e.g., students) to be supported by transmitting one multicast stream of packets (e.g., a video stream of the lecture). In contrast, unicast requires multiple individual sets of packets (e.g., multiple identical video streams of the lecture) to be sent to each of the users (e.g., each student). A disadvantage of multicast is that it does not support retransmission. Accordingly, the client devices must use other strategies to overcome dropped, damaged, or out-of-order multicast packets.

In the current systems, where a wireless access point is sending multicast transmissions to a set of wireless clients, the data rate of the multicast transmissions are being decreased in order to attempt to increase the reliability (or probability of reception) of multicast transmissions. While using a lower data rate for multicast increases reliability, it also dramatically increases the time required to transmit a data stream. For instance, a multicast stream may be transmitted at an 11 Megabyte per second (Mb/sec) data rate while the full high-throughput 802.11 unicast connection is capable of delivering 450 Mb/sec data rates.

Current adaptations of the multicast systems include (i) increasing the multicast transmission rate and (ii) converting the single multicast stream to a plurality of unicast streams. Both adaptations present disadvantages. In the first adaptation, increasing the multicast transmission rate may decrease required transmission times, but it also increases data loss for client devices that are located farther from the access point or for client devices that are dealing with compromised signal conditions. Given that there are no automatic retries or retransmission in multicast, this adaptation results in increased data loss which leads to stuttering video, drop-outs, etc. In the second adaptation, the conversion of a single multicast stream targeting multiple client devices into multiple unicast streams, each being addressed to a single client, results in an increased transmission time and this adaptation cannot accommodate a large number of client devices.

SUMMARY

In one embodiment of the invention, a method begins with a network device receiving a multicast stream that may include a frame. The network device may determine whether to send the frame unicast or multicast based on characteristics of the frame. The characteristics of the frame may include characteristics of a key frame such as an I-frame. In that embodiment, the frame that includes characteristics of an I-frame is determined to be transmitted unicast. The network device may then transmit the frame unicast or multicast based on the determination.

In another embodiment of the invention, a network device includes a communication interface and a processor. The communication interface may receive a multicast stream that includes a frame. The processor is coupled to the communication interface and may determine whether to send the frame unicast or multicast. The communication interface transmits the frame unicast or multicast based on the determination by the processor. The determination by the processor may be based on characteristics of the frame. If the characteristics of the frame include characteristics of a key frame such as an I-frame, the processor may determine to transmit the frame unicast. The determination may also be based on a predetermined state of client devices that are to receive the frame. If a client device is in a predetermined state such as a power save state, the processor may determine to transmit the frame unicast to that client device.

In yet another embodiment of the invention, a non-transitory computer-readable medium has stored thereon instructions, which when executed by a processor of a network device, causes the network device to perform a method. This method starts by receiving a multicast stream including a frame. The network device then determines whether to send the frame unicast or multicast based on characteristics of the frame and transmits the frame unicast or multicast based on the determination. In one embodiment, the frame is inspected to determine if the characteristics of the frame include characteristics of an I-frame and if so, the frame is transmitted unicast.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
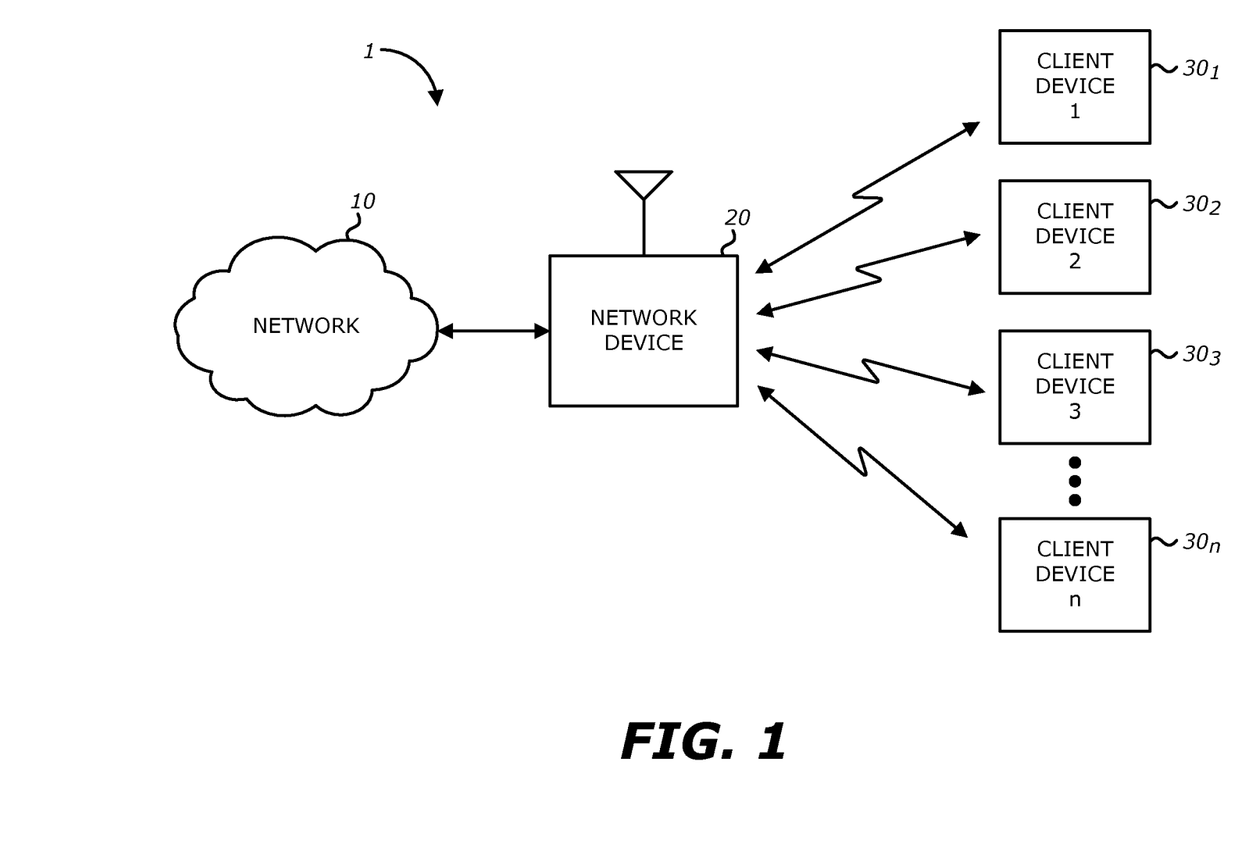
FIG. 1 shows exemplary block diagram of a system in which one embodiment of the invention may be implemented.

FIG. 1 shows exemplary block diagram of a system in which one embodiment of the invention may be implemented. System 1, as illustrated in FIG. 1, is a digital system that includes a network 10 which may be the Internet, a network device 20 and a plurality of client devices $30_1$-$30_n$ (n>1). For clarity, FIG. 1 does not show other typical elements such as switches, routers, firewalls, etc.

The network device 20 is coupled to the network 10 via a transmission medium to receive and examine data streams. The data streams may be, for instance, video data streams. The transmission medium may be a wired or a wireless connection. The network device 20 may be a device such as a wired or wireless access port, a switch, a router, or any combination thereof.

The client devices $30_1$-$30_n$ are coupled to the network device 20 via a wireless connection. The client devices $30_1$-$30_n$ may be digital devices including a processor, memory hierarchy, and input/output (I/O) interfaces including a wireless interface such as an IEEE 802.11 wireless interface. The wireless interface may be used to communicate with the network device 20 (e.g., a wireless access point). The client devices $30_1$-$30_n$ may be wireless electronic devices capable of receiving the video data streams such as personal computers, laptop computers, netbook computers, wireless music players, portable telephone communications devices, smart phones, tablets, digital televisions, etc.

Figure 2:
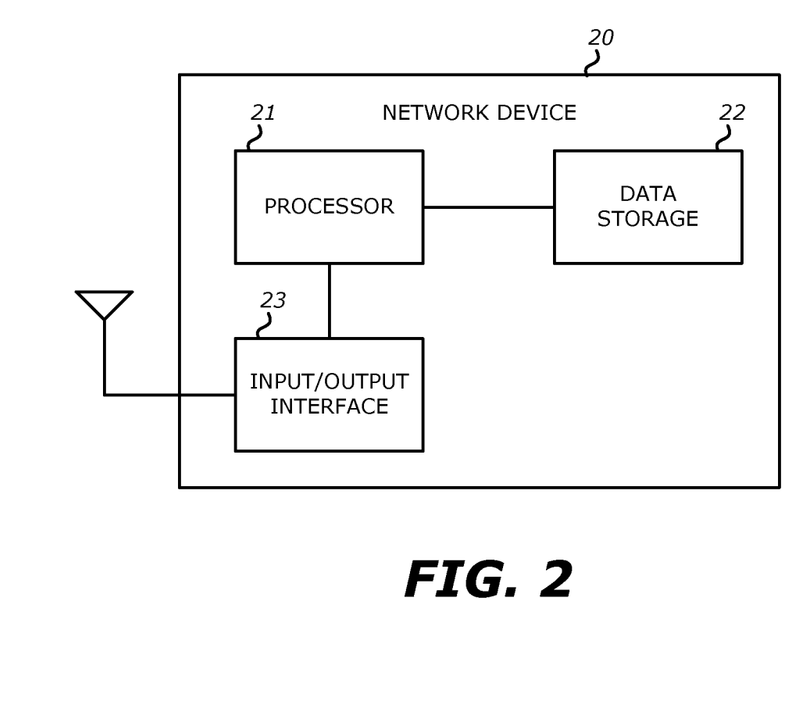
FIG. 2 shows exemplary block diagram of a network device according to one embodiment of the invention.

FIG. 2 shows exemplary block diagram of a network device according to one embodiment of the invention. The network device 20 may be a purpose-build digital device that comprises a processor 21, data storage 22, and an I/O interface 23.

The data storage 22 of the network device 20 may include a fast read-write memory for storing programs and data during the network device 20's operations and a hierarchy of persistent memory such as ROM, EPROM, and Flash memory for storing instructions and data needed for the network device 20's startup and a file system for the network device 20's operations.

The I/O interface 23 may include a wired network interface such as an IEEE 802.3 Ethernet interface and a wireless interface such as an IEEE 802.11 WiFi interface. The I/O interface 23 may receive a multicast stream that includes at least one frame and may transmit each of the frames as a unicast frame or as a multicast frame to at least one of the client devices $30_1$-$30_n$. The multicast stream may be, for instance, a video multicast stream.

As shown in FIG. 2, the processor 21 is coupled to the data storage 22 and the I/O interface 23. The processor 21 may be any processing device including, but not limited or restricted to a MIPS-class processor, a microprocessor, a digital signal processor, an application specific integrated circuit, a microcontroller, a state machine, or any type of programmable logic array.

In one embodiment, the I/O interface 23 receives video multicast stream and sends the stream to the processor 21, which determines whether to send the frame unicast or multicast. The determination by the processor 21 may be based on characteristics of the frame. In one embodiment, the processor 21 performs deep packet inspection (DPI) on each of the frames to analyze the characteristics of the frame. Based on the determination by the processor 21, the communication interface 23 may then transmits the frame unicast or multicast. In one embodiment, the determination is based on a predetermined state of client devices $30_1$-$30_n$ that are to receive the frame. If a client device $30_1$ is in a predetermined state such as a power save state, the processor 21 may determine to transmit the frame unicast to that client device $30_1$. In another embodiment, if the characteristics of the frame include characteristics of a key frame, and thus revealing that the frame is a key frame, the processor 21 may determine that the frame is to be transmitted unicast. Examples of key frames include, but are not limited, to frames such as I-frames or I-slices in video standards such as H.264/MPEG4. In some embodiments, the processor 21 may convert the frame that is determined to be sent unicast into a unicast frame.

As is known in the digital arts, multimedia and video streams are highly compressed. In the form of compression that is used in MPEG-2 video streams and in DVDs, the video image stream is encoded as a series of key (or reference) frames each followed by frames containing changes ("change frames") to these key frames. These change frames are typically much smaller than the key frames. In MPEG-2, for example, the key frames are referred to as I-frames, and the change frames are referred to as P-frames and B-frames. In some embodiments, the slices may be used instead of frames, such that the key slices are I-slices and the change slices are P-slices and B-slices.

For example, in a scene where a ball rolls across a fixed background, a key frame or I-frame would contain the complete detail of the image, while subsequent P-frames would only contain those elements of the image that have changed from the previous frame. In practice, key frames are sent periodically (e.g., once per second) and used to establish reference points. The intervening P- and B-frames are numerous and smaller in size since these frames only represent the changes.

Accordingly, during reception of a video data stream, if one or more P- or B-frames are lost, the image reconstruction may still be performed, although with sub-optimal results. In contrast, if a key frame such as an I-frame is lost, image reconstruction using subsequent B- and/or P-frames cannot be performed given that the reference (i.e., the I-frame) on which the changes identified in these B- and/or P-frames are based is not available. Image reconstruction cannot continue until the next key frame is successfully received. Thus, since the key frames are the foundation of the series of images, the reception of these key frames by the client devices $30_1$-$30_n$ is critical. Accordingly, in one embodiment, the processor 21 may determine based on DPI that a frame is a key frame and determine that this (key) frame is to be transmitted unicast.

In this embodiment of the invention, the I/O interface 23 transmits the frame unicast to each of the client devices $30_1$-$30_n$. When the key frames are sent as unicast frames, the key frames may be transmitted at the full data rate supported by the client device $30_1$-$30_n$ rather than at the typically much slower multicast rate. As unicast frames, in addition to being transmitted at higher data rates, the key frames are also transmitted with full error control, which assures delivery of these key frames to the client devices $30_1$-$30_n$. Further, since the change frames are sent as multicast frames to the client devices $30_1$-$30_n$, the data rate of transmission may be increased such that the total transmission time of the video data stream may be decreased.

In one embodiment, the network device 20 may be a wireless access point that operates under the control of software or an operating system (OS), such as Linux, running specific programs to provide for access point operation. The OS may be stored in the data storage 22 and executed by the processor 21 to cause the network device 20 to perform access point operations.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 3:
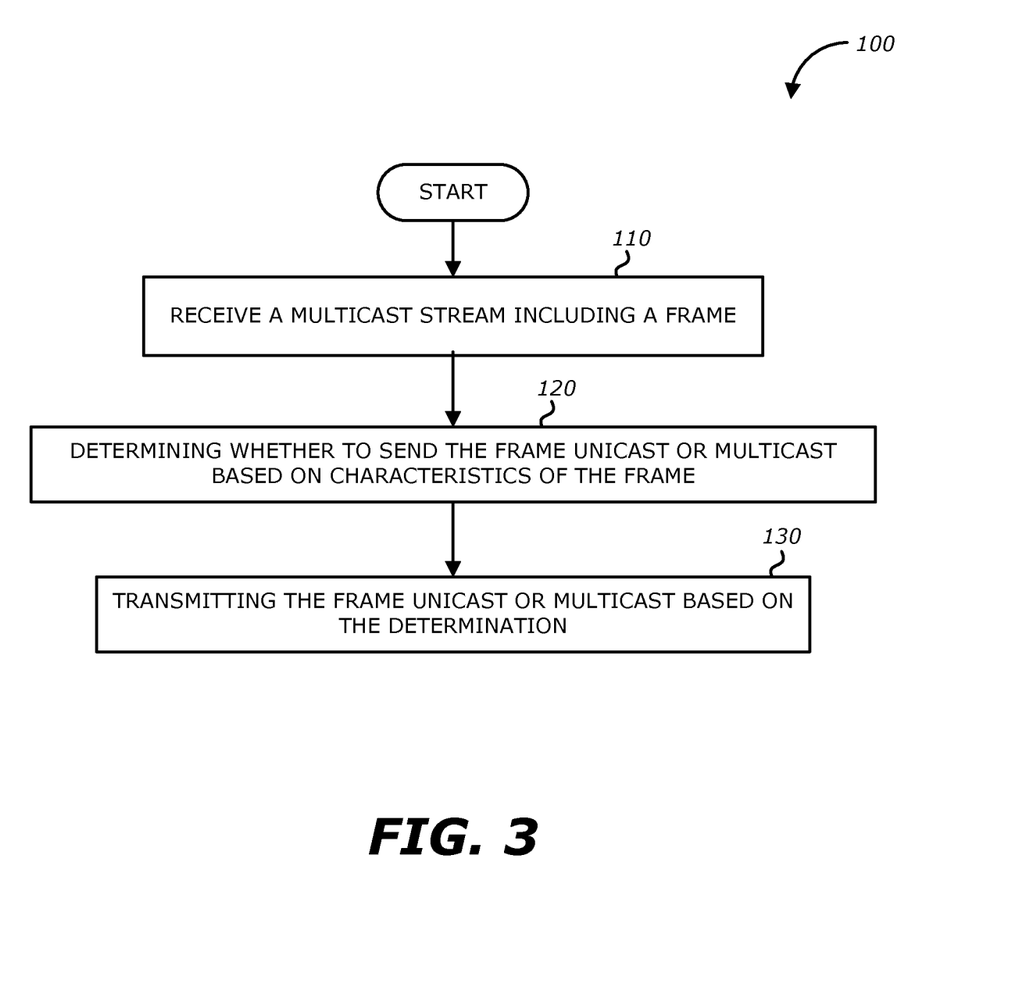
FIG. 3 shows a flowchart illustrating a process performed by a network device according to one embodiment of the invention.

FIG. 3 shows a flowchart illustrating a process performed by a network device according to one embodiment of the invention.

Method 100 starts by receiving a multicast stream by a network device at Block 110. The video multicast stream may comprise at least one frame, which may include key frames and change frames. At Block 120, the network device may determine whether to send the frame unicast or multicast based on the characteristics of the frame. At Block 130, the network device may transmit the frame unicast or multicast based on the determination in Block 120. This method 100 allows for the network device to optimize the video multicast by transmitting some frames as unicast and others as multicast.

Figure 4:
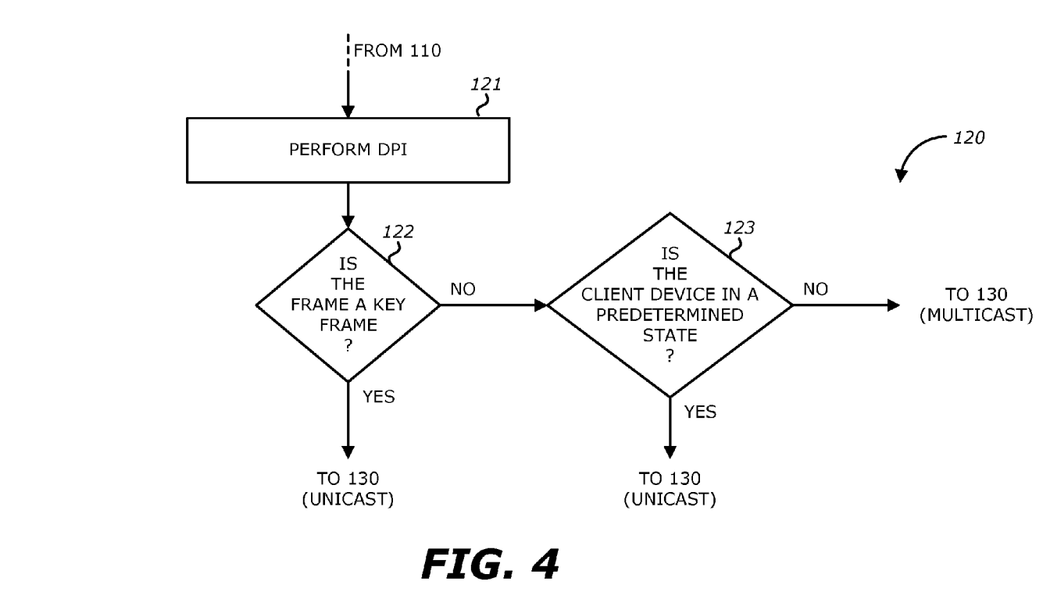
FIG. 4 shows a flowchart illustrating the details of the process of Block 103 from FIG. 3 according to one embodiment of the invention.

FIG. 4 shows a flowchart illustrating the details of the process of Block 120 from FIG. 3 according to one embodiment of the invention. As discussed above, at Block 120, the network device determines whether to send the frame unicast or multicast. As illustrated in FIG. 4, to make this determination, the network device performs deep packet inspection on the frame at Block 121. Based on the DPI, the network device then determines whether the frame is a key frame at Block 122. In one embodiment, the network device analyzes the characteristics of the frame which may include characteristics of a key frame such as an I-frame or include an I-slice. In that embodiment, the frame that includes characteristics of an I-frame is determined to be a key frame at Block 122 and is to be transmitted unicast at Block 104. In some embodiments, if the network determine determines that the frame is not a key frame at Block 122, the method 100 continues to Block 123 where the network device assesses each of the client devices to determine if any of the client devices are in a predetermined state. For instance, referring to FIG. 1, the network device 20 assesses client devices $30_1$-$30_n$ to determine if any of the client devices $30_1$-$30_n$ are in a predetermined state. If network device 20 determines that client device $30_1$ is in a predetermined state, the frame is determined to be sent unicast to the client device in the predetermined state at Block 104. In one embodiment, the predetermined state is a power save state. In the power save state, the client device may not be able to buffer multicast traffic. Referring to FIG. 4, if at Block 123, if none of the client devices are in a predetermined state, the method 100 continues to Block 104 where the frame is transmitted multicast.

Figure 5:
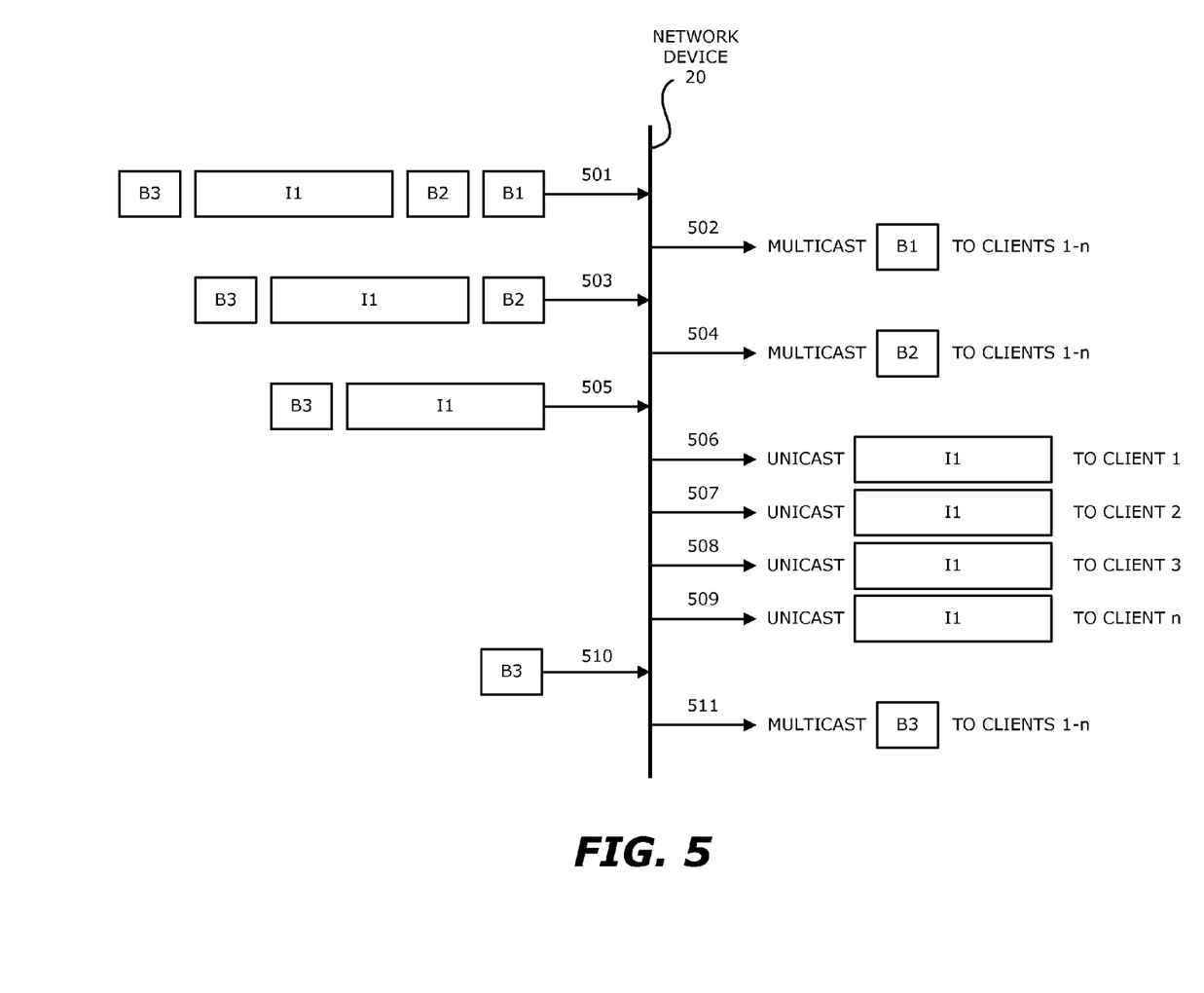
FIG. 5 shows a sequence diagram illustrating an example of the process of performed by a network device according to an embodiment of the invention.

FIG. 5 shows a sequence diagram illustrating an example of the process of optimizing the video multicast by a network device according to an embodiment of the invention. As illustrated in FIG. 5, in one embodiment, the network device 20 receives a multicast video data stream from a network 10 (not shown). Only one copy of the multicast video stream is being transmitted. In this embodiment, the network device 20 transmits the packets included in the video data stream to the client devices $30_1$-$30_n$.

Method 500 starts with the network device 20 receiving a video data stream at sequence 501. The video data stream in FIG. 5 includes packets B1, B2, I1, and B3. The packets B1, B2, and B3 are B-packets while the packet I1 is an I-packet, which is a key packet. The B-packets are shown schematically shorter than the I-packet to be indicative of the difference in time required to transmit frames at the multicast rate, which may default to as low as 11 Mb/sec, as compared to a high-throughput 802.11n unicast rate of 300 Mb/sec.

At sequence 502, the network device 20 determines based on DPI that B1 is not a key packet and the network device 20 transmits B1 to client devices $30_1$-$30_n$ as a multicast packet. At sequence 503, the network device 20 receive B2 and at sequence 504, determines based on DPI that B2 is not a key packet and the network device 20 transmits B2 to client devices $30_1$-$30_n$ as a multicast packet. At sequence 505, the network device 20 receives I1. The network device 20 determines based on DPI that I1 is a key frame and the network device 20 transmits I1 as a unicast frame to client device $30_1$ at sequence 506, transmits I1 as a unicast frame to client device $30_2$ at sequence 507, transmits I1 as a unicast frame to client device $30_3$ at sequence 508, and transmits I1 as a unicast frame to client device $30_n$ at sequence 509. At sequence 510, the network device 20 determines based on DPI that B3 is not a key packet and the network device 20 transmits B3 to client devices $30_1$-$30_n$ as a multicast packet at sequence 511.

In another embodiment of the invention, non-key frames such as the B- and P-frames in MPEG-2 may also be converted to unicast as bandwidth and/or channel loading permits.

Figure 6:
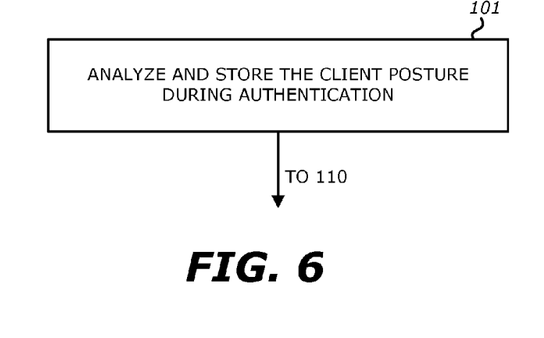
FIG. 6 shows a flowchart illustrating an additional step in the process from FIG. 3 performed by a network device according to one embodiment of the invention.

FIG. 6 shows a flowchart illustrating an additional step in the process from FIG. 3 of optimizing the video multicast by a network device according to one embodiment of the invention.

In this embodiment, prior to receiving the multicast video stream at Block 110 of FIG. 3, the network device analyzes and stores a client posture associated with each of the plurality client devices (Block 101). In one embodiment, the analyzing and storing of the client posture (Block 101) is performed during authentication of each of the client devices. The client posture may include, for example, information on a type of application installed on the client device. In this embodiment, at Block 107, the network device may determine determining if the client device is a potential threat based on the type of application installed on the one of the plurality of client devices. The client posture may also include, for instance, a version of an application installed on the client device. In this embodiment, at Block 107, the network device may determine a signature set for DPI based on the version of an application installed on the one of the plurality of client devices.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hard-wired logic. Those operations might alternatively be performed by any combination of programmable computer components and fixed hardware circuit components.

An embodiment of the present invention also may be embedded in non-transitory manner in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

An embodiment of the present invention may be realized in hardware, software, or a combination of hardware and software. A typical combination of hardware and software may be a network server or access point with a computer program that, when being loaded and executed, controls aspects of the host device such that it carries out the methods described herein.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. A computer implemented method, comprising:
    receiving, at a network device, a video multicast stream, wherein the video multicast stream comprises a video frame;
    analyzing the video frame to identify a video frame characteristic;
    determining, based upon the identified video frame characteristic, whether to transmit the video frame as a unicast frame or a multicast frame;
    transmitting the video frame as a unicast frame in response to a determination that the video frame characteristic indicates that the video frame is a key frame; and
    transmitting the video frame as a multicast frame in response to a determination that the video frame characteristic indicates that the video frame is not a key frame.

2. The method of claim 1, wherein the video frame is an I-frame or wherein the video frame comprises an I-slice.

3. The method of claim 1, wherein the video frame is a P-frame or a B-frame, or wherein video the frame comprises a P-slice or a B-slice.

4. The method of claim 1, further comprising:
    identifying a status of a client device, wherein determining whether to transmit the video frame as a unicast frame or a multicast frame further comprises determining whether to transmit the video frame as a unicast frame or a multicast frame based upon the identified status of the client device; and
    transmitting the video frame to the client device as a unicast frame in response to the status of the client device indicating that the client device is in a power save state.

5. The method of claim 1, further comprising:
    identifying an application of a client device, wherein the application is used to determine whether to transmit the video frame as a unicast frame or a multicast frame; and
    transmitting the video frame to the client device as a unicast frame in response to the application indicating that the video frame is to be transmitted as a unicast frame and transmitting the video frame to the client device as a multicast frame in response to the application indicating that the video frame is to be transmitted as a multicast frame.

6. The method of claim 1, wherein analyzing the video frame comprises performing deep packet inspection (DPI).

7. The method of claim 1, further comprising:
    receiving a client posture associated with a client device, wherein the client posture includes a type of application installed on the client device, and wherein the client posture includes a version of the application; and
    determining, based upon the type of application or the version of the application, whether the client device is a potential threat.

8. The method of claim 1, wherein the network device is a wireless access point and wherein transmitting the video frame comprises transmitting the video frame using a wireless interface of the wireless access point.

9. A system, comprising:
    one or more processors; and
    a non-transitory computer readable storage medium coupled to the one or more processors, wherein the non-transitory computer readable storage medium includes instructions that, when executed by the one or more processors, cause the one or more processors to:
    receive a video multicast stream, wherein the video multicast stream comprises a video frame;
    analyze the video frame to identify a video frame characteristic;
    determine, based upon the identified video frame characteristic whether to transmit the video frame as a unicast frame or a multicast frame;
    transmit the video frame as a unicast video frame in response to a determination that the video frame characteristic indicates that the video frame is a key frame; and
    transmit the video frame as a multicast frame in response to a determination that the video frame characteristic indicates that the video frame is not a key frame.

10. The system of claim 9, wherein the video frame is an I-frame or wherein the video frame comprises an I-slice.

11. The system of claim 9, wherein the video frame is a P-frame or a B-frame, or wherein video the frame comprises a P-slice or a B-slice.

12. The system of claim 9, wherein the instructions are further to cause the one or more processors to:

identify a status of a client device, wherein, to determine whether to transmit the video frame as a unicast frame or a multicast frame and to transmit the video frame as a unicast frame or a multicast frame based upon the identified status of the client device; and transmit the video frame as a unicast frame to the client device in response to the status of the client device indicating that the client device is in a power save state.

13. The system of claim 9, wherein the instructions are further to cause the one or more processors to:

identify an application of a client device, wherein the application is used to determine whether to transmit the video frame as a unicast frame or a multicast frame; and transmit the video frame to the client device as a unicast frame in response to the application indicating that the video frame is to be transmitted as a unicast frame and transmitting the video frame to the client device as a multicast frame in response to the application indicating that the video frame is to be transmitted as a multicast frame.

14. The system of claim 9, wherein to analyze the video frame, the instructions are to cause the one or more processors to perform deep packet inspection (DPI).

15. The system of claim 9, wherein the instructions are further to cause the one or more processors to:

receive a client posture associated with a client device, wherein the client posture includes a type of application installed on the client device, and wherein the client posture includes a version of the application; and determine, based upon the type of application or the version of the application, whether the client device is a potential threat.

16. The system of claim 9, further comprising:

a wireless interface, wherein the instructions are to cause the one or more processors to transmit the video frame using the wireless interface.

17. A non-transitory computer readable medium comprising instructions that, when executed by one or more processors, cause the one or more processors to perform operations including:

receive a video multicast stream, wherein the video multicast stream includes a video frame;

analyze the video frame to identify a video frame characteristic;

determine, based upon the identified video frame characteristic whether to transmit the video frame as a unicast frame or a multicast frame;

transmit the video frame as a unicast video frame in response to a determination that the video frame characteristic indicates that the video frame is a key frame; and transmit the video frame as a multicast frame in response to a determination that the video frame characteristic indicates that the video frame is not a key frame.

18. The non-transitory computer readable medium of claim 17, wherein the video frame is an I-frame or wherein the video frame comprises an I-slice.

19. The non-transitory computer readable medium of claim 17, wherein the video frame is a P-frame or a B-frame, or wherein video the frame comprises a P-slice or a B-slice.

20. The non-transitory computer readable medium of claim 17, further comprising instructions that, when executed by the one or more processors, cause the one or more processors to:

identify a status of a client device, wherein, to determine whether to transmit the video frame as a unicast frame or a multicast frame and to transmit the video frame as a unicast frame or a multicast frame based upon the identified status of the client device; and transmit the video frame as a unicast frame to the client device in response to the status of the client device indicating that the client device is in a power save state.

21. The non-transitory computer readable medium of claim 17, further comprising instructions that, when executed by the one or more processors, cause the one or more processors:

identify an application of a client device, wherein the application is used to determine whether to transmit the video frame as a unicast frame or a multicast frame; and transmit the video frame to the client device as a unicast frame in response to the application indicating that the video frame is to be transmitted as a unicast frame and transmitting the video frame to the client device as a multicast frame in response to the application indicating that the video frame is to be transmitted as a multicast frame.

22. The non-transitory computer readable medium of claim 17, wherein to analyze the video frame, the instructions are to cause the one or more processors to perform deep packet inspection (DPI).

23. The non-transitory computer readable medium of claim 17, further comprising instructions that, when executed by the one or more processors, cause the one or more processors:

receive a client posture associated with a client device, wherein the client posture includes a type of application installed on the client device, and wherein the client posture includes a version of the application; and determine, based upon the type of application or the version of the application, whether the client device is a potential threat.

24. The non-transitory computer readable medium of claim 17, wherein to transmit the video frame, the instructions are to cause the one or more processors to transmit the video frame using a wireless interface.

* * * * *